US011300221B2

United States Patent
Kim et al.

(10) Patent No.: US 11,300,221 B2
(45) Date of Patent: Apr. 12, 2022

(54) VALVE APPARATUS FOR VEHICLE

(71) Applicants: Hyundai Motor Company, Seoul (KR); Kia Motors Corporation, Seoul (KR); Inzicontrols Co., Ltd., Siheung-si (KR)

(72) Inventors: Jae Yeon Kim, Hwaseong-si (KR); Jun Ho Jang, Incheon (KR); Hyuk Ju Ko, Incheon (KR)

(73) Assignees: HYUNDAI MOTOR COMPANY, Seoul (KR); INZICONIROLS CO., LTD., Seoul (KR); KIA MOTORS CORPORATION, Siheung-si (KR)

( * ) Notice: Subject to any disclaimer, the term of this patent is extended or adjusted under 35 U.S.C. 154(b) by 152 days.

(21) Appl. No.: 16/870,734

(22) Filed: May 8, 2020

(65) Prior Publication Data
US 2021/0131579 A1  May 6, 2021

(30) Foreign Application Priority Data
Nov. 4, 2019  (KR) ........................ 10-2019-0139308

(51) Int. Cl.
*F16K 31/00* (2006.01)
*F16H 57/04* (2010.01)

(52) U.S. Cl.
CPC ....... *F16K 31/002* (2013.01); *F16H 57/0413* (2013.01)

(58) Field of Classification Search
CPC .. F16K 31/002; F16K 11/044; F16H 57/0413; F16H 57/0435
See application file for complete search history.

(56) References Cited

U.S. PATENT DOCUMENTS

| 4,190,198 A | * | 2/1980 | Casuga | .................. F01M 5/007 236/34.5 |
| 5,746,170 A | | 5/1998 | Moriya | |
| 5,791,557 A | * | 8/1998 | Kunze | ................ G05D 23/1333 236/34.5 |
| 6,253,837 B1 | | 7/2001 | Seiler et al. | |
| 10,007,281 B2 | * | 6/2018 | Qiu | ........................ F16K 31/002 |

(Continued)

FOREIGN PATENT DOCUMENTS

| KR | 101382817 | 4/2014 |
| KR | 20190047018 A | 5/2019 |
| KR | 20120039008 A | 4/2020 |

*Primary Examiner* — Umashankar Venkatesan
(74) *Attorney, Agent, or Firm* — Slater Matsil, LLP (57) ABSTRACT

A valve apparatus for a vehicle includes a housing having open and closed ends to form an interior space, and formed with first and second intake ports receiving a transmission fluid from a transmission and an oil cooler, a bypass port bypassing the transmission fluid to the transmission, and an exhaust port exhausting the transmission fluid to the oil cooler, an inner cap inserted at least partially into the interior space, fixed to the housing, and having an open hole inserted into the interior space, an operation unit disposed between the inner cap and the closed end of the housing, and reciprocally moves according to a transmission fluid temperature, a valve unit disposed in the operation unit to selectively open and close the bypass port and the exhaust port depending on a movement of the operation unit; and an elastic member interposed between the inner cap and the operation unit.

18 Claims, 7 Drawing Sheets

(56) References Cited

U.S. PATENT DOCUMENTS

| | | | |
|---|---|---|---|
| 2003/0136855 A1* | 7/2003 | Brown | F01M 5/007 236/101 R |
| 2009/0026405 A1* | 1/2009 | Sheppard | G05D 23/1333 251/364 |
| 2010/0126594 A1* | 5/2010 | Sheppard | F01P 7/16 137/340 |
| 2012/0247582 A1* | 10/2012 | Lamb | F16K 11/044 137/468 |
| 2018/0299023 A1* | 10/2018 | Gao | F16H 57/0413 |

* cited by examiner

VALVE APPARATUS FOR VEHICLE

CROSS-REFERENCE TO RELATED APPLICATIONS

This application claims priority to Korean Patent Application No. 10-2019-0139308, filed in the Korean Intellectual Property Office on Nov. 4, 2019, which application is hereby incorporated herein by reference.

TECHNICAL FIELD

The present invention relates to a valve apparatus for a vehicle.

BACKGROUND

In general, a valve is a device that is installed in a pipeline or in a container to allow inflow of a fluid including a gas such as air and a liquid such as water, and exhausts the inflow fluid to the outside or blocks the exhaust to control a flow rate and a pressure of the fluid.

Typically, such a valve is configured to be able to control the flow of a fluid by manipulating a valve seat through which fluid passes using a valve stem and a handle, or to be able to perform remote adjustment by detecting the temperature of the fluid flowing through the valve seat using a separate temperature control device.

Meanwhile, in recent years, the valve capable of being controlled depending on the temperature as described above has been applied to the cooling apparatus for cooling the transmission fluid, e.g., transmission oil.

The conventional transmission fluid cooling system is divided into an air-cooling type and a water-cooling type, in order to prevent an excessive temperature rise due to slip of transmission components by keeping the temperature of the transmission fluid at a predetermined temperature, and simultaneously in order to prevent an increase in friction loss of the transmission due to an increase in oil viscosity and a resultant deterioration of fuel consumption, at the time of excessive cooling of the transmission fluid.

Among them, an air-cooled transmission fluid cooling system includes an oil cooler provided at a location such as a front of a radiator at which the outside air smoothly flows, and a bypass valve that is installed in a pipe between the oil cooler and the transmission to be opened and closed depending on the temperature of the transmission fluid. Thus, when the temperature of the oil is higher than the predetermined temperature, the transmission fluid is caused to pass through the heat exchanger via the bypass valve, and when the temperature of oil is lower than the predetermined temperature, the transmission fluid is not allowed to pass through the heat exchanger, thereby keeping the transmission fluid at the predetermined temperature.

However, in the bypass valve to be applied to the conventional transmission fluid cooling system as described above, since each of the constituent elements needs to be sequentially fitted and assembled to a valve mounting hole of a valve housing, there are drawbacks in which it is difficult to precisely position each of the constituent elements, excessive assembling time is required, and the manufacturing cost increases.

Furthermore, the bypass valve applied to the transmission fluid cooling system also has a drawback in which, when cooling of the transmission fluid is not required, since a part of the low-temperature transmission fluid cooled from the oil cooler flows into the bypass valve from the transmission and then flows into the transmission, together with the bypassed transmission fluid in a high-temperature state, the rapid warming of the transmission fluid is difficult.

In addition, since the conventional bypass valve is located in the flow passage pipe that connects the transmission and the oil cooler, and a relatively large bypass valve is located in the pipe, there is also a drawback in which spatial utility of an engine compartment is degraded.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a valve apparatus for a vehicle having advantages of a simple structure to efficiently distributing flow of a transmission fluid.

An exemplary valve apparatus for a vehicle includes a housing having an open end and a closed end to form an interior space, and formed with, on a first side, a first intake port receiving a transmission fluid from a transmission and a bypass port bypassing the transmission fluid to the transmission, and on a second side, a second intake port receiving a transmission fluid from an oil cooler and an exhaust port exhausting the transmission fluid to the oil cooler, an inner cap having an open end inserted into the interior space, a closed end fixed to the open end of the housing, and at least one open hole in a portion inserted into the interior space, an operation unit disposed in the interior space between the inner cap and the closed end of the housing, and configured to reciprocally move along a length direction of the housing according to a temperature of the transmission fluid flown into the housing through the first intake port, a valve unit disposed in the operation unit to selectively open and close the bypass port and the exhaust port depending on a movement of the operation unit, and an elastic member interposed between the inner cap and the operation unit, and providing an elastic force to the operation unit with respect to the inner cap.

The operation unit may include a fixed rod having one end fixed to a fixing recess formed on an interior side of the closed end of the housing, and a deformation member having one end partially inserted into another end of the fixed rod and configured to expand and contract according to a temperature of the transmission fluid flowing into the housing through the first intake port, thereby to reciprocally move with respect to the fixed rod.

The deformation member may include a wax material that contracts and expands according to the temperature of the transmission fluid.

The elastic member may be a coil spring selectively compressed according to an operation of the operation unit and abutted at one end by the inner cap and at another end by the deformation member to provide the elastic force to the operation unit.

The inner cap may include a catching end formed along an exterior circumference of the closed end of the inner cap such that the catching end may be caught by an interior circumference of the open end of the housing, an insertion portion inserted into an interior of the housing, and formed with a plurality of open holes by a predetermined spacing along an exterior circumference of the insertion portion at positions corresponding to the bypass port and the second intake port, a first fixing portion formed between the catching end and the insertion portion at a position proximate to the catching end, an exterior circumference of the first fixing portion being supported by the interior circumference of the housing, a second fixing portion formed on an exterior circumference of the insertion portion, at a position spaced apart from the first fixing portion toward the open end of the inner cap interposing the open hole, and a supporting portion extending toward an opposite side of the catching end from the second fixing portion, partially receiving the operation unit, and forming at least one opening groove in an exterior circumference of the supporting portion such that a transmission fluid received from the transmission through the first intake port may flow to the open hole.

A fixing ring may be mounted at the open end of the housing to prevent the inner cap from being separated from the housing.

First and second sealing rings may be respectively mounted to the first and second fixing portions, such that the transmission fluid flown into the housing may be prevented from leaking between the housing and the inner cap.

The opening may connect the first intake port and the bypass port through the open holes when the operation unit maintains an initial state partially inserted into the supporting portion.

A valve hole delineated by a valve seat having a slanted surface at an interior circumference may be formed at the housing, at a position displaced from the first intake port toward the closed end of the housing, correspondingly to the valve unit.

The valve unit may include a valve member coupled to a coupling step formed in the operation unit, and extending outward in a radial direction of the operation unit, and a tight-contact member mounted on an exterior circumference the valve member, an exterior circumference of the tight-contact member being selectively tight-contacted with the slanted surface of the valve seat in accordance with the operation of the operation unit.

The valve member may be coupled to the coupling step in a detachable press-fit state.

The tight-contact member may be formed of a rubber material and configured to limit a movement range of the operation unit while tightly contacting the slanted surface by the elastic force provided from the elastic member, and to enable communication between the first intake port and the exhaust port by opening the valve hole when the operation unit operates.

The tight-contact member may be formed in a ring shape having a diameter lager than an interior diameter of the slanted surface. At least two tight-contact steps may be formed in the tight-contact member so as to contact the slanted surface. A groove may be formed between the tight-contact steps.

The at least two tight-contact step may include a first tight-contact step tightly contacting the slanted surface at a position in the vicinity of the first intake port, and a second tight-contact step tightly contacting the slanted surface at a position in the vicinity of the exhaust port, wherein the tight-contact member dually contacts the slanted surface through the first and second tight-contact steps, to prevent the transmission fluid from leaking between the tight-contact member and the valve hole.

When the operation unit does not operate, the valve unit may be close the valve hole by maintaining a tight contact of the tight-contact member on the slanted surface such that the first intake port and the exhaust port are not interconnected.

The inner cap may be integrally formed by an injection molding.

The bypass port may be disposed on the first side of the housing on a same axis with the second intake port, correspondingly to the open hole.

The first intake port and the second intake port may be disposed at opposite positions on different sides of the housing. The exhaust port may be disposed on the second side of the housing, at a staggered position with respect to the first intake port.

When the temperature of the transmission fluid is above a predetermined value, the operation unit may move toward the inner cap to compress the elastic member and simultaneously to close a connection of the first intake port and the bypass port, and the valve unit may open the valve hole to open the exhaust port, and When the temperature of the transmission fluid is below a predetermined value, the operation unit may return to or maintain at an initial position by the elastic force of the elastic member to maintain connection between the first intake port and the bypass port, and the valve unit may close the valve hole to close the exhaust port.

According to a valve apparatus for a vehicle according to an exemplary embodiment, expansion or contraction may be rapidly performed in a simple structure according to the temperature of the transmission fluid to control the flow of the transmission fluid to bypass or to be supplied to oil cooler. Therefore, constituent elements may be simplified and production and assembly may also be simplified, thereby decreasing production cost.

In addition, the amount of flow may be increase by employing a bypass flow passage, and the transmission fluid cooled at an oil cooler is prevented from leaking to a transmission, thereby achieving reliability of flow control according to the temperature of the transmission fluid.

Friction loss of the transmission 5 may be decreased through rapid warming-up of the transmission fluid, thereby improving overall fuel efficiency of the vehicle.

Furthermore, a required power for a hydraulic pump may be reduced by increasing a bypass flow amount of the transmission fluid.

Internal constituent elements may be post-assembled to the housing 101, and may be replaced in the case of failure, thereby decreasing a maintenance cost and improving convenience of replacement work.

DETAILED DESCRIPTION OF ILLUSTRATIVE EMBODIMENTS

An example embodiment of the present invention will hereinafter be described in detail with reference to the accompanying drawings.

Exemplary embodiments disclosed in the present specification and the constructions depicted in the drawings are only the preferred embodiments of the present invention, and do not cover the entire scope of the present invention. Therefore, it will be understood that there may be various equivalents and variations at the time of the application of this specification.

In order to clarify the present invention, parts that are not connected to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

In addition, unless explicitly described to the contrary, the word "comprise" and variations such as "comprises" or "comprising", will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

Figure 1:
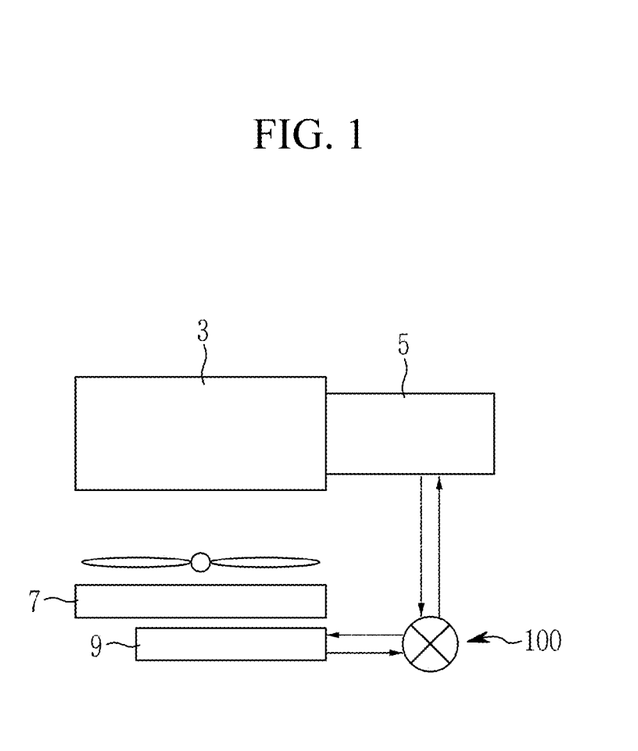
FIG. 1 is a block diagram of a transmission fluid cooling system applicable with a valve apparatus for a vehicle according to an exemplary embodiment.
Figure 2:
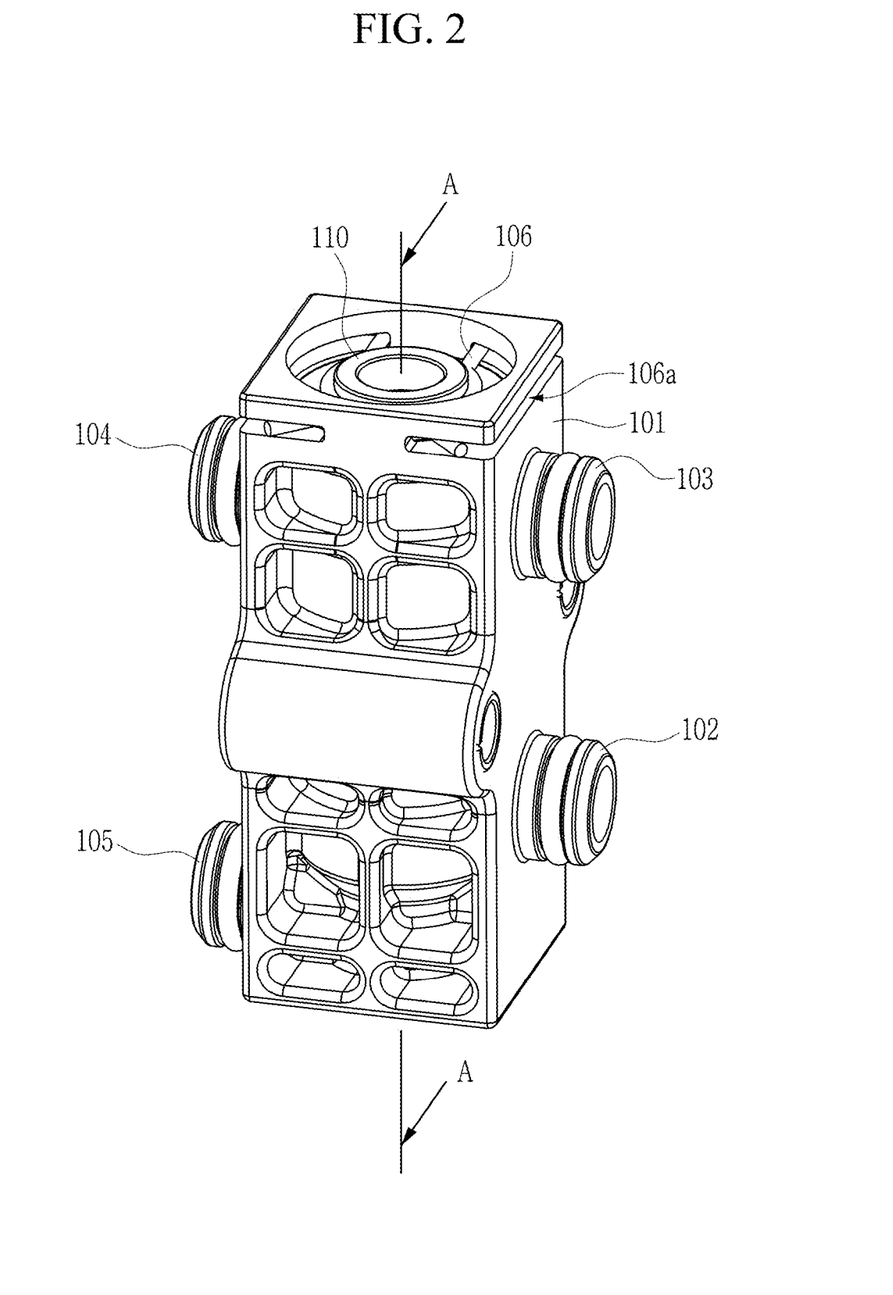
FIG. 2 is a perspective view of a valve apparatus for a vehicle according to an exemplary embodiment.
Figure 3:
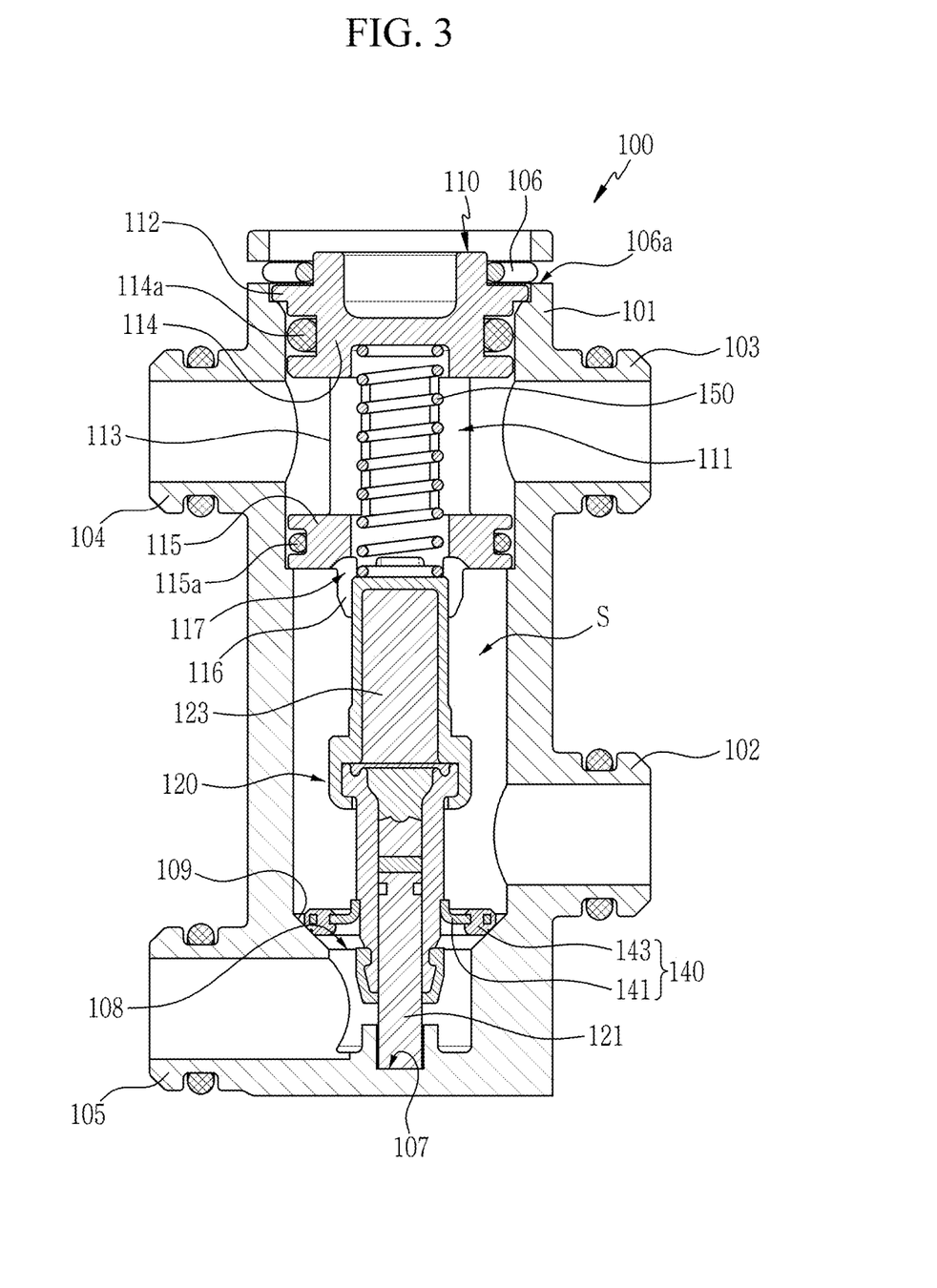
FIG. 3 is a cross-sectional view taken along line A-A of FIG. 2.
Figure 4:
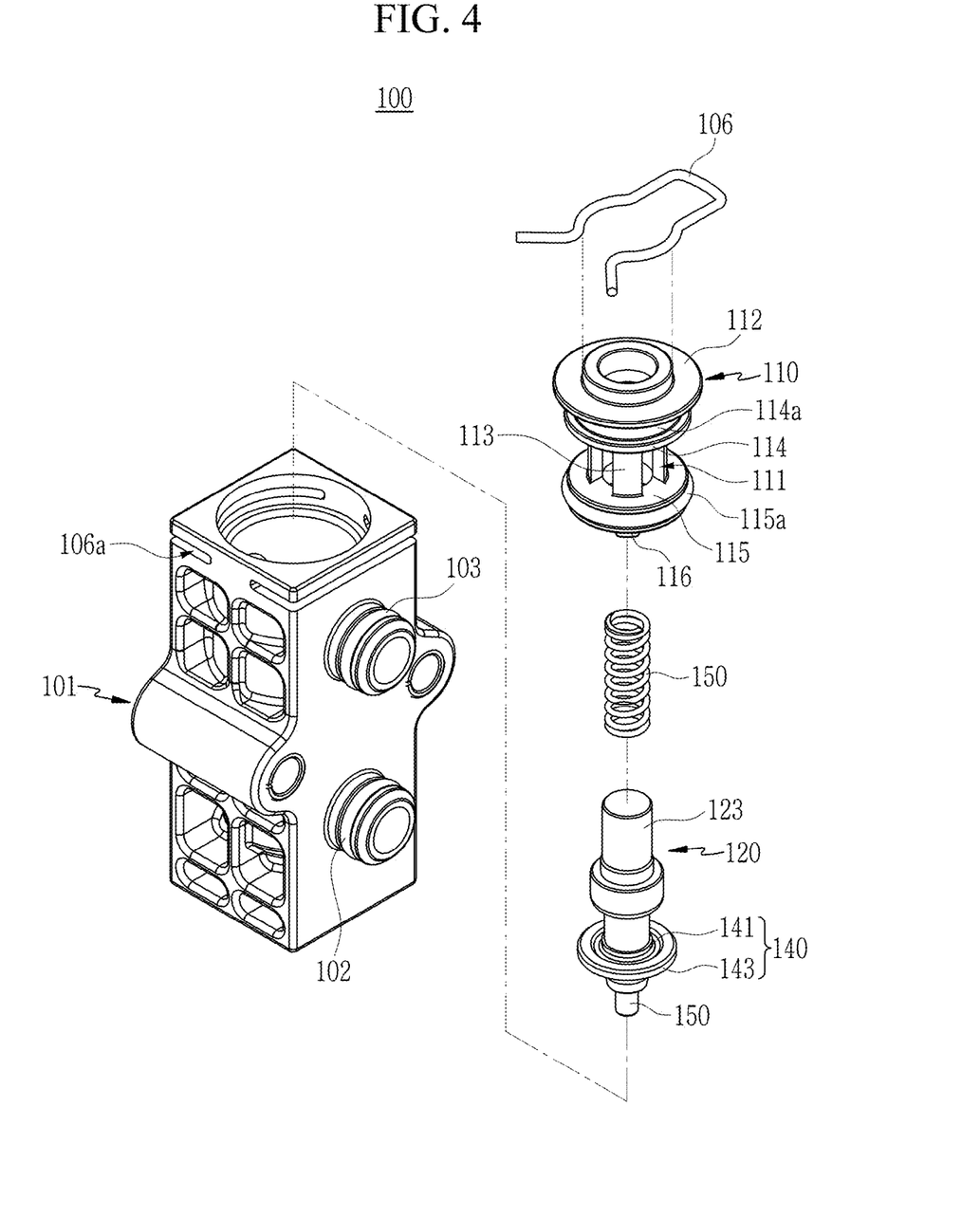
FIG. 4 is an exploded perspective view of a valve apparatus for a vehicle according to an exemplary embodiment.
Figure 5:
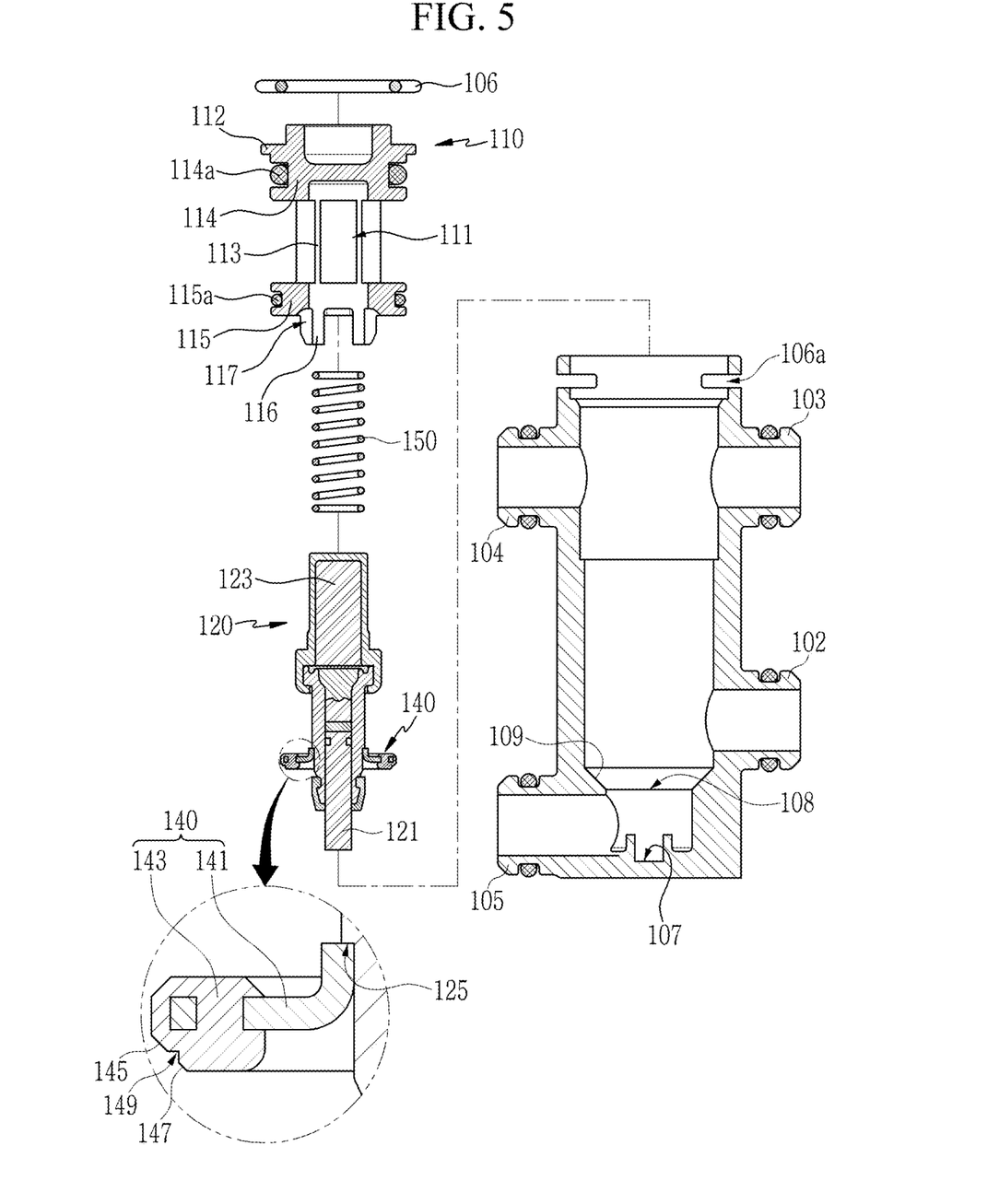
FIG. 5 is an exploded sectional view of a valve apparatus for a vehicle according to an exemplary embodiment.

FIG. 1 is a block diagram of a transmission fluid cooling system applicable with a valve apparatus for a vehicle according to an exemplary embodiment, FIG. 2 is a perspective view of a valve apparatus for a vehicle according to an exemplary embodiment, and FIG. 3 is a cross-sectional view taken along line A-A of FIG. 2, and FIG. 4 is an exploded perspective view of a valve apparatus for a vehicle according to an exemplary embodiment.

Figure 6:
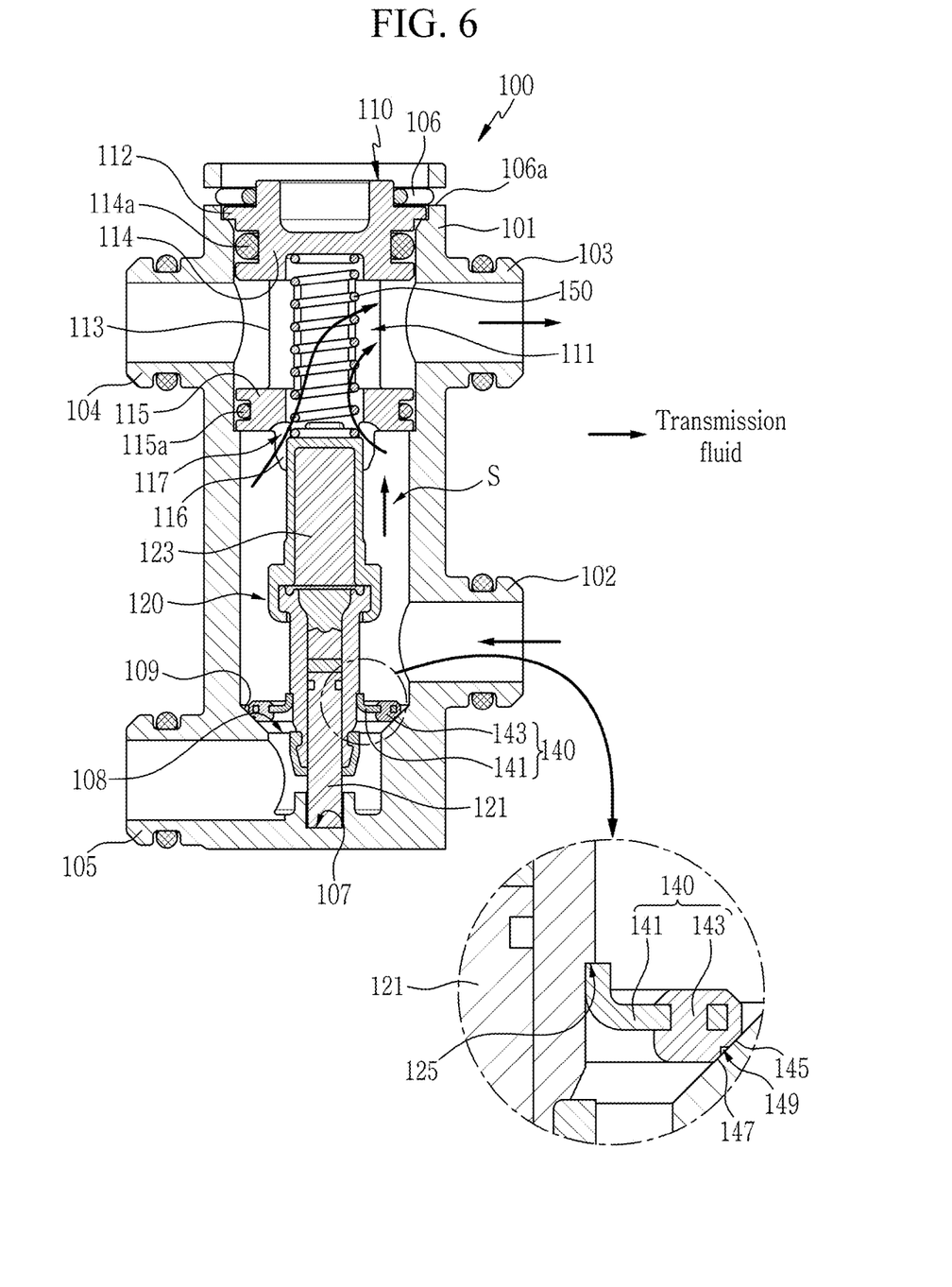
FIG. 6 and FIG. 7 respectively illustrate an operation state of a valve apparatus for a vehicle according to an exemplary embodiment.
Figure 7:
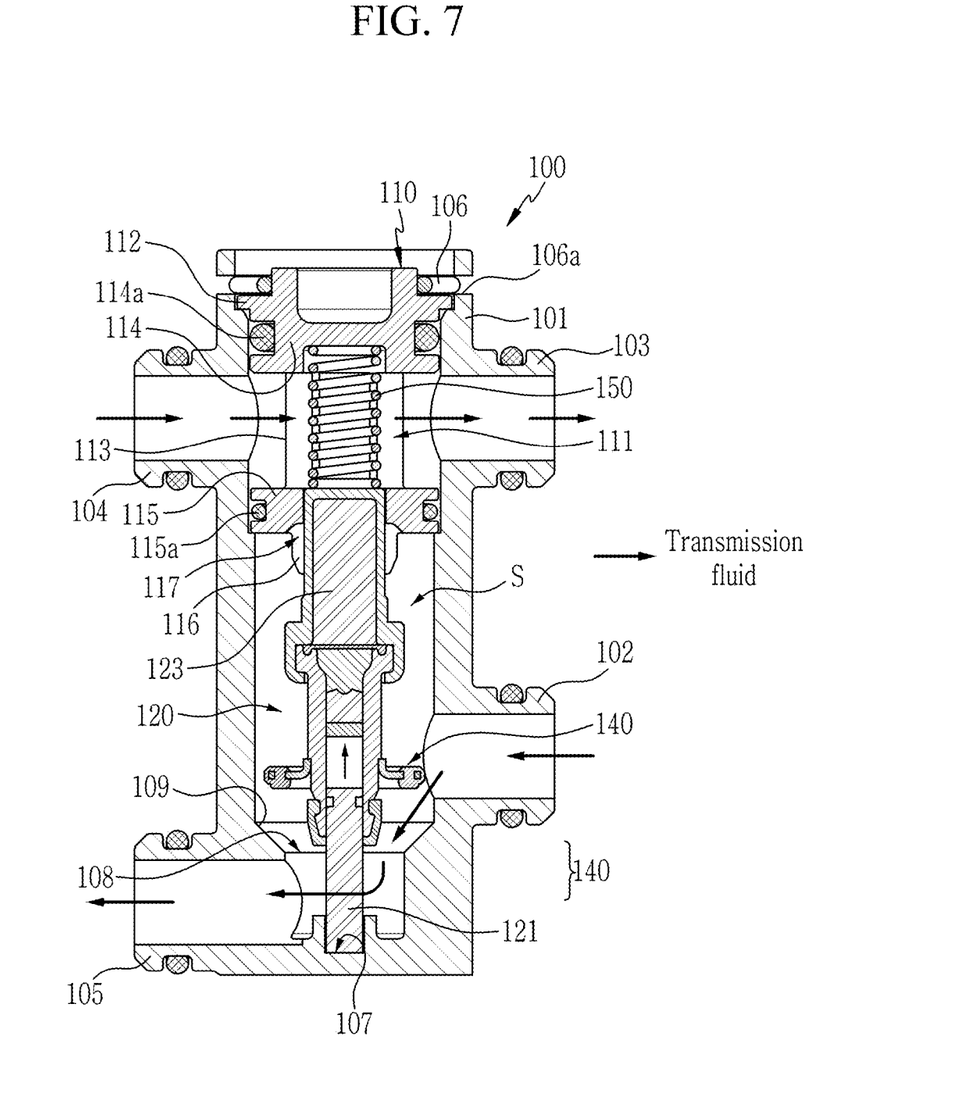

FIG. 6 and FIG. 7 respectively illustrate an operation state of a valve apparatus for a vehicle according to an exemplary embodiment.

Referring to the drawings, a valve apparatus 100 for a vehicle according to an exemplary embodiment is disposed between a fluid cooler (hereinafter, referred to as an oil cooler) 9 and a transmission 5, and controls a flow of transmission fluid according to the temperature of the transmission fluid, where the oil cooler 9 may be formed in known simple structure to cool the transmission fluid.

For such a purpose, as shown in FIG. 1, the valve apparatus 100 for a vehicle according to an exemplary embodiment is disposed between the transmission 5 and the oil cooler 9 included in a transmission fluid cooling system including the oil cooler 9 that is disposed in front of a radiator 7 and cools the transmission fluid through heat-exchange with a flowing ambient air to prevent overheating of the transmission fluid filled in a transmission 5 mounted on an engine.

As shown in FIG. 2 to FIG. 4, such a valve apparatus 100 for a vehicle includes a housing 101, an inner cap 110, an operation unit 120, a valve unit 140, and an elastic member 150.

The housing 101 includes an open side and a closed side, and forms an interior space S.

The housing 101 is formed in a rectangular pillar shape.

On a first side (e.g., the right side in FIG. 2) of the housing 101, a first intake port 102 receiving the transmission fluid from the transmission 5 and a bypass port 103 bypassing the transmission fluid to the transmission 5 are formed.

On a second side (e.g., the left side in FIG. 2) of the housing 101, a second intake port 104 receiving the transmission fluid from the oil cooler 9 and an exhaust port 105 exhausting the transmission fluid to the oil cooler 9 may be formed.

Here, the first intake port 102 and the second intake port 104 may be disposed at opposite positions on different sides of the housing 101.

In more detail, the first intake port 102 is formed at a lower position on the first side of the housing 101, and connected to the transmission 5 through a pipe or hose.

The second intake port 104 is formed at an upper position of the second side of the housing 101, and connected to the oil cooler 9 through a pipe or hose.

The exhaust port 105 may be disposed on the second side of the housing 101, at a staggered position with respect to the first intake port 102, e.g., at a position approaching to a bottom side of the housing 101 from the height of the first intake port 102.

That is, the exhaust port 105 is formed, on the second side of the housing 101, at a position spaced apart from the second intake port 104 toward the bottom side of the housing 101. The bypass port 103 is formed on the first side of the housing 101, at a same height with the second intake port 104.

Accordingly, the transmission fluid flowing from the transmission 5 into the housing 101 through the first intake port 102 may, by the operation unit 120 selectively operating according to the temperature of the transmission fluid, flow back to the transmission 5 through the bypass port 103, or be exhausted to the oil cooler 9 through the exhaust port 105.

In addition, the transmission fluid supplied from the oil cooler 9 may flow to the housing 101 through the second intake port 104, and be exhausted to the transmission 5 through the bypass port 103.

The first and second intake ports 102 and 104, the bypass port 103, and the exhaust port 105 may communicate with the interior space S of the housing 101.

The housing 101 may be formed of a synthetic resin material such as plastic, but is not limited thereto. The housing 101 may be formed of a material that may withstand a flow amount and flow rate of the transmission fluid and has an excellent thermal resistance.

In the present exemplary embodiment, the inner cap 110 has an open end (a lower end in FIG. 3) and a closed end (an upper end in FIG. 3).

The open end of the inner cap 110 is partially inserted into the interior space S, and the closed end of the inner cap 110 is fixed to the open end of the housing 101.

The inner cap 110 may be formed with at least one open hole 111, at a portion inserted into the interior space S.

In the present exemplary embodiment, four open holes 111 spaced apart by 90 degrees may be formed along an exterior circumference of the inner cap 110.

The four open holes 111 spaced apart by 90 degrees along an exterior circumference of the inner cap 110 may be a mere example, and is not limited thereto. The number and positions of the at least one open hole 111 may vary.

The inner cap 110 may be of a cylinder shape. The open and closed ends of the inner cap 110 are disposed in opposite directions of the open and closed ends of the housing 101. The inner cap 110 may be integrally formed by an injection molding.

The inner cap 110 may include a catching end 112, an insertion portion 113, first and second fixing portions 114 and 115, and a supporting portion 116.

The catching end 112 may be formed along an exterior circumference of the closed end of the inner cap 110 such that the catching end 112 may be caught by an interior circumference of the open end of the housing 101.

Here, a fixing ring 106 may be mounted at the open end of the housing 101 to prevent the inner cap 110 from being separated from the housing 101.

The fixing ring 106 may be mounted in a ring groove 106a formed along an exterior circumference of the open end of the housing 101.

That is, the fixing ring 106 holds the closed end of the inner cap 110 while the catching end 112 of the inner cap 110 is supported by the housing 101, and therefore, the inner cap 110 may be prevented from being separated from the housing 101.

The insertion portion 113 is inserted into the interior of the housing 101, and may be formed with a plurality of open holes 111 by a predetermined spacing along the exterior circumference of the insertion portion 113 at positions corresponding to the bypass port 103 and the second intake port 104.

In the present exemplary embodiment, the first fixing portion 114 is formed between the catching end 112 and the insertion portion 113 at a position proximate to the catching end 112, and an exterior circumference of the first fixing portion 114 is supported by the interior circumference of the housing 101 within the interior space S.

The second fixing portion 115 is formed on an exterior circumference of the insertion portion 113, at a position spaced apart from the first fixing portion 114 toward the open end of the inner cap 110 interposing the open hole 111.

The exterior circumference of the second fixing portion 115 may be supported by the interior circumference of the housing 101 within the interior space S.

Here, first and second sealing rings 114a and 115a may be respectively mounted to the first and second fixing portions 114 and 115, such that the transmission fluid flown into the housing 101 may be prevented from leaking between the housing 101 and the inner cap 110.

The first and second sealing rings 114a and 115a interposes the open hole 111, and may respectively form a sealing between exterior circumferences of the first and second fixing portions 114 and 115 and the interior circumference of the housing 101.

Therefore, the first and second sealing rings 114a and 115a may prevent the transmission fluid from leaking along the interior circumference the housing 101 and the exterior circumference the first and second fixing portions 114 and 115.

The supporting portion 116 extends toward an opposite side of the catching end 112 from the second fixing portion 115. A deformation member 123 of the operation unit 120 may be partially inserted into the supporting portion 116.

In addition, at least one opening groove 117 may be formed in an exterior circumference of the supporting portion 116 such that the transmission fluid received from the transmission 5 through the first intake port 102 may flow to the open hole 111.

The opening grooves 117 may be formed at positions spaced by a predetermined angle along a circumferential direction. In the present exemplary embodiment, four opening grooves 117 may be spaced apart from each other at 90 degrees along a circumference of the supporting portion 116.

The opening groove 117 may connect the first intake port 102 and the bypass port 103 through the open holes 111 when the operation unit 120 maintains an initial state partially inserted into the supporting portion 116.

Here, the bypass port 103 may be disposed on a same axis with the second intake port 104 at the first side of the housing 101, correspondingly to the open hole 111.

In the present exemplary embodiment, the operation unit 120 includes a fixed rod 121 and the deformation member 123.

The fixed rod 121 has one end fixed to a fixing recess 107 formed on an interior side of the closed end of the housing 101.

The fixed rod 121 is formed in a circular rod shape, one end of which may be fixed to the fixing recess 107.

One end of the deformation member 123 is partially inserted into another end (i.e., an end that is not fixed to the fixing recess 107) of the fixed rod 121.

The deformation member 123 expands and contracts according to a temperature of the transmission fluid flowing into the housing 101 through the first intake port 102, and thereby reciprocally moves with respect to the fixed rod 121.

That is, the deformation member 123 changes its position with respect to the fixed rod 121 by a displacement in a straight line.

Here, the first intake port 102 may be positioned at a position in a vicinity of the deformation member 123 such that deformation of the deformation member 123 is easily generated by the inflowing transmission fluid through the first intake port 102.

Such a deformation member 123 may include a wax material that contracts and expands according to the temperature of an operation fluid such as the transmission fluid.

The wax material varies its volume according to the temperature, that is, the volume increases when the temperature increases and decreases when the temperature decreases.

That is, the deformation member 123 is an assembly including a wax material therein, and when a volume deformation of the wax material occurs according to the temperature, the operation unit 120 may reciprocally move along the axis of on the fixed rod 121.

When a transmission fluid above a predetermined temperature is received through the first intake port 102, the volume of the deformation member 123 expands, and the deformation member 123 may move from an initial position toward the another end of the fixed rod 121, i.e., upward in the drawings.

Then, the deformation member 123 is inserted into the supporting portion 116 toward the second fixing portion 115, to thereby close the opening groove 117 communicating with the open hole 111 and to compress the elastic member 150.

In contrast, when the transmission fluid below the predetermined temperature is received, the temperature of the deformation member 123 is decreased, and the volume of the deformation member 123 contracts from the expanded state. Therefore, the deformation member 12 moves toward the fixing recess 107 by the elastic force of the compressed elastic member 150.

That is, from the state expanded toward the inner cap 110 along the fixed rod 121, the deformation member 123 may return to the initial position by the elastic force of the elastic member 150 together with volumetric contraction.

In the present exemplary embodiment, the elastic member 150 is interposed between the inner cap 110 and the operation unit 120, and may provide an elastic force to the operation unit 120 with respect to the inner cap 110.

The elastic member 150 may be a coil spring abutted at one end by the inner cap 110 and at the other end by the deformation member 123 such that the elastic member 150 may be selectively compressed according to the operation of the operation unit 120 and provides an elastic force to the operation unit 120.

Although not shown in detail, a heater (not shown) may be installed in the operation unit 120 to directly heat the deformation member 123 separately from the transmission fluid according to driving conditions such as a load state of the vehicle.

In the present exemplary embodiment, a valve hole 108 delineated by a valve seat having a slanted surface 109 at an interior circumference may be formed at the housing 101, at a position displaced from the first intake port 102 toward the closed end of the housing 101, correspondingly to the valve unit 140.

Here, the valve unit 140 includes a valve member 141 and a tight-contact member 143.

The valve member 141 is coupled to a coupling step 125 formed in the operation unit 120, and may extend outward in the radial direction of the operation unit 120.

Here, the valve member 141 may be coupled to the coupling step 125 in a detachable press-fit state.

The tight-contact member 143 is mounted on an exterior circumference the valve member 141. An exterior circumference of the tight-contact member 143 may be selectively tight-contacted with the slanted surface 109 of the valve seat in accordance with the operation of the operation unit 120.

Here, the tight-contact member 143 is formed of a rubber material. The tight-contact member 143 may limit a movement range of the operation unit 120 while tightly contacting the slanted surface 109 by the elastic force provided from the elastic member 150.

In addition, when the operation unit 120 operates, the tight-contact member 143 may enable communication between the first intake poll 102 and the exhaust port 105 by opening the valve hole 108.

This tight-contact member 143 is formed in a ring shape having a diameter lager than an interior diameter of the slanted surface 108.

Here, at least two tight-contact steps may be formed in the tight-contact member 143 so as to contact the slanted surface 109, and a groove 149 may be formed between the tight-contact steps.

In the present exemplary embodiment, the tight-contact steps may include a first tight-contact step 145 tightly contacting the slanted surface 109 at a position in the vicinity of the first intake port 102 and a second tight-contact step 147 tightly contacting the slanted surface 109 at a position in the vicinity of the exhaust port 105.

Accordingly, the tight-contact member 143 may dually contact the slanted surface 109 through the first and second tight-contact steps 145 and 147 to prevent the transmission fluid from leaking between the tight-contact member 143 and the valve hole 109.

When the operation unit 120 does not operate, the valve unit 140 closes the valve hole 108 by maintaining the tight contact of the tight-contact member 143 on the slanted surface 109 such that the first intake port 102 and the exhaust port 105 are not interconnected.

The groove 149 formed between the first and second tight-contact steps 145 and 147 may improve the tightness in contact between the first and second tight-contact steps 145 and 147 and the slanted surface 109.

Since the tight-contact member 143 dually tight-contacts the slanted surface 109 through the first and second tight-contact steps 145 and 147, a sealing force is increased at closing of the valve hole 108 is increased, and therefore, a rapid warm-up of the transmission 5 may be induced, thereby improving fuel consumption of a vehicle.

In addition, since the tight-contact member 143 is formed of an elastic rubber material, the sealing force and the contacting tightness may have excellent characteristics.

The valve member 141 is supported by the coupling step 125 and may be detachably pressed into the exterior circumference the operation unit 120.

Accordingly, a worker may easily perform replacement work of the valve unit 140 when the valve unit 140 is worn or damaged.

On the other hand, the valve unit 140 may be applied by changing the size of the valve member 141 when the size of the valve hole 108 is changed to secure the required fluid amount of the transmission fluid.

Therefore, a customizing effect that may be expected since various conditions may be satisfied merely by changing the size of the valve member 141 without changing the whole part to secure the required fluid amount of the transmission fluid.

In addition, since the tight-contact member 143 is formed of a material such as rubber, the tight-contact member 143 may provide the operation unit 120 with a repulsive force against the elastic force of the elastic member 150.

More specifically, with the deformation member 123 elastically pressurized by the elastic member 150, when the valve unit 140 is tightly contacted with the slanted surface 109 of the valve seat, the valve unit 140 may be limited in a movement of the operation unit 120 toward the fixing recess 107.

In other words, the repulsive force generated between the coupling step 125 coupled with the valve member 141 and the close-contacting force of the tight-contact member 143 with respect to the slanted surface 109 may limit a movement range of the operation unit 120 such that the operation unit 120 is not pushed toward the fixing recess 107.

Therefore, a separate stopper device for limiting an operation range of the operation unit 120 may not be employed, and thereby entire constituent elements of the valve apparatus 100 may be reduced, thereby simplifying the structure.

That is, the valve unit 140 mounted through the operation unit 120 may realize a valve function that opens and closes the valve hole 108, and may also realize a stopper function that limits an operation range of the operation unit 120 elastically pressurized by the elastic member 150.

In the present exemplary embodiment, it has been described that the valve unit 140 opens and closes the valve hole 108 according to the operation of the operation unit 120, but it may be understood that such is a mere exemplary embodiment, and is not limited thereto.

For example, at least one flow hole (not shown) may be formed at the valve member 141 such that a part of the transmission fluid flown into the first intake port 102 may be exhausted to the oil cooler 9 through the exhaust port 105 when the operation unit 120 is operated according to the temperature of the transmission fluid.

Accordingly, the flow hole enable a predetermined amount of the transmission fluid to flow to the oil cooler 9 even if the operation unit 120 malfunctions, and therefore, may prevent overheat and damage of the transmission 5.

Hereinafter, an operation of a valve apparatus 100 for a vehicle according to an exemplary embodiment is described in detail with reference to FIG. 6 and FIG. 7.

Referring to FIG. 6, the valve hole 108 is closed in an initial state that the tight-contact member 143 of the valve unit 140 tightly contacts the slanted surface 109 of the valve seat.

Accordingly, the operation unit 120 may maintain a state in which the deformation member 123 is partially inserted into the supporting portion 116. Then, the first intake port 102 may be connected to the bypass port 103 through the opening groove 117 and the open hole 111.

In this state, when the transmission fluid having a temperature below a predetermined temperature flows through the first intake port 102, the deformation member 123 is not expanded or contracted and the position does not change.

In this case, the valve unit 140 maintains the valve hole 108 closed.

Accordingly, the transmission fluid flown from the transmission 5 through the first intake port 102 flows into the interior of the inner cap 110 through the opening groove 117, and is exhausted to the bypass port 103 through the open holes 111.

The transmission fluid exhausted to the bypass port 103 flows back to the transmission 5.

Here, the operation unit 120 can be prevented from moving further toward the elastic member 150 by the repulsive force of the valve unit 140 between the coupling step 125 and the valve hole 108.

When the transmission fluid is below a predetermined temperature, the valve apparatus 100 bypasses the transmission fluid received from the transmission 5 back to the transmission 5 through the bypass port 103 such that the transmission fluid may not be cooled by passing through the oil cooler 9. Therefore, the transmission 5 may be rapidly warmed-up.

Here, although a cooled transmission fluid exhausted from the oil cooler 9 flows to the second intake port 104 in an open state, the transmission fluid does not flows to the oil cooler 9 the exhaust port 105, and therefore, only a minor amount of the transmission fluid is received through the second intake port 104, and flows to the transmission 5 together with the bypassing transmission fluid having a predetermined temperature.

That is, the cooled transmission fluid of the minor amount received through the second intake port 104 does not affect the temperature of the bypassing transmission fluid, and the transmission fluid having the predetermined temperature continues to bypass to the transmission 5, thereby enabling a more rapid warming-up of the transmission 5.

By such an operation of a valve apparatus 100 for a vehicle according to an exemplary embodiment, a more rapid warming-up of the transmission 5 may be enabled, thereby rapidly reducing friction loss of the transmission 5 and improving an overall fuel consumption of the vehicle.

In contrast, as shown in FIG. 7, when the transmission fluid received through the first intake port 102 is above a predetermined temperature, the deformation member 123 of the operation unit 120 expands and moves toward the second fixing portion 115.

Then, the valve unit 140 may move together with the deformation member 123 to open the valve hole 108. Simultaneously, the deformation member 123 is partially inserted into the second fixing portion 115, and closes the opening groove 117 to prevent communication between the opening groove 117 and the open hole 111.

That is, the valve unit 140 moves upward together with the deformation member 123 to open the closed valve hole 108, and the deformation member 123 compresses the elastic member 150.

At this time, the transmission fluid above a predetermined temperature received through the first intake port 102 passes through the open valve hole 108 to flow to the oil cooler 9 through the exhaust port 105.

Then, the transmission fluid flown into the oil cooler 9 is cooled at the oil cooler 9 by heat-exchange with an ambient air. After being cooled at the oil cooler 9, the transmission fluid flows into the housing 101 through the second intake port 104, and then flows to the transmission 5 through the bypass port 103 connected to the second intake port 104 through the open holes 111.

Accordingly, the transmission fluid cooled in the oil cooler 9 flows into the transmission 5 overheated due to the rise of the temperature of the transmission fluid to cool the transmission 5. Therefore, the transmission fluid cooled at the oil cooler 9 flows to the transmission 5 containing heated transmission fluid, and may cool the transmission 5.

On the other hand, the elastic member 150 is compressed by the deformation member 123 that has expanded and moved from the fixed rod 121.

In this state, when the temperature of the transmission fluid received through the first intake port 102 decreases below a predetermined temperature, the deformation member 123 contracts to the initial state and moves toward the fixing recess 107 along the fixed rod 121.

At this time, the deformation member 123 may rapidly return to its initial position by the elastic force of the compressed elastic member 150.

Simultaneously, the valve unit 140 moves together with the deformation member 123 to return to the initial position and thereby to close the opened valve hole 117.

That is, in the present exemplary embodiment, when the temperature of the transmission fluid is above a predetermined value, the operation unit 120 moves toward the inner cap 110 to compress the elastic member 150 and simultaneously to close the connection of the first intake port 102 and the bypass port 103, and the valve unit 140 opens the valve hole 108 to open the exhaust port 105.

In contrast, when the temperature of the transmission fluid is below a predetermined value, the operation unit 120 may return to or maintain at the initial position by the elastic force of the elastic member 150 to maintain connection between the first intake port 102 and the bypass port 103, and the valve unit 140 closes the valve hole 108 to close the exhaust port 105.

As discussed above, the valve apparatus 100 may selectively warm-up or cool the transmission 5 by the operation unit 120 operating according to the temperature of the transmission fluid received from the transmission 5 and by the valve unit 140 operating with the operation unit 120, thereby improving reliability and responsiveness of a valve operation.

According to a valve apparatus 100 for a vehicle according to an exemplary embodiment, expansion or contraction may be rapidly performed in a simple structure according to the temperature of the transmission fluid to control the flow of the transmission fluid to bypass or to be supplied to oil cooler 9. Therefore, constituent elements may be simplified and production and assembly may also be simplified, thereby decreasing production cost.

In addition, the amount of flow may be increase by employing a bypass flow passage, and the transmission fluid cooled at the oil cooler 9 is prevented from leaking to the transmission 5, thereby achieving reliability of flow control according to the temperature of the transmission fluid.

Friction loss of the transmission 5 may be decreased through rapid warming-up of the transmission fluid, thereby improving overall fuel efficiency of the vehicle.

Furthermore, a required power for a hydraulic pump may be reduced by increasing a bypass flow amount of the transmission fluid.

Internal constituent elements may be post-assembled to the housing 101, and may be replaced in the case of failure, thereby decreasing a maintenance cost and improving convenience of replacement work.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

3: engine
5: transmission
7: radiator
9: oil cooler
100: valve
101: housing
102, 104: first and second intake ports
103: bypass port
105: exhaust port
106: fixing ring
106a: ring groove
107: fixing recess
108: valve hole
109: valve seat slanted surface
110: inner cap
111: open hole
112: catching end
113: insertion portion
114, 115: first and second fixing portions
114a, 115a: first and second sealing rings
116: supporting portion
117: opening groove
120: operation unit
121: fixed rod
123: deformation member
125: coupling step
140: valve unit
141: valve member
143: tight-contact member
145: first tight-contact step
147: second tight-contact step
149: groove
150: elastic member
S: interior space

What is claimed is:

1. A valve apparatus for a vehicle, comprising:
a housing having an open end and a closed end to form an interior space, and having, on a first side of a vertical plane, a first intake port configured to receive transmission fluid from a transmission and a bypass port configured to bypass the transmission fluid to the transmission, and, on a second side of the vertical plane, a second intake port configured to receive the transmission fluid from an oil cooler and an exhaust port configured to exhaust the transmission fluid to the oil cooler;
an inner cap having an open end inserted into the interior space, and a closed end fixed to the open end of the housing, wherein the inner cap comprises:
a catching end formed along an exterior circumference of the closed end of the inner cap such that the catching end is catchable by an interior circumference of the open end of the housing;
an insertion portion inserted into an interior of the housing, and comprising a plurality of open holes at a predetermined spacing along an exterior circumference of the insertion portion at positions corresponding to the bypass port and the second intake port;
a first fixing portion formed between the catching end and the insertion portion at a first position proximate to the catching end, wherein an exterior circumference of the first fixing portion is supported by the interior circumference of the housing;
a second fixing portion formed on an exterior circumference of the insertion portion, at a second position spaced apart from the first fixing portion toward the open end of the inner cap interposing the open holes; and
a supporting portion extending toward an opposite side of the catching end from the second fixing portion, partially receiving an operation unit, and forming at least one opening groove in an exterior circumference of the supporting portion such that the transmission fluid received from the transmission through the first intake port flows to the open holes;
the operation unit disposed in the interior space between the inner cap and the closed end of the housing, and configured to reciprocally move along a length direction of the housing according to a temperature of the transmission fluid flowing into the housing through the first intake port;
a valve unit disposed in the operation unit and configured to selectively open and close the bypass port and the exhaust port depending on a movement of the operation unit; and
an elastic member interposed between the inner cap and the operation unit, and providing an elastic force to the operation unit with respect to the inner cap.

2. The valve apparatus of claim 1, wherein the operation unit comprises:
a fixed rod having one end fixed to a fixing recess formed on an interior side of the closed end of the housing; and
a deformation member having one end partially inserted into another end of the fixed rod and configured to expand and contract according to the temperature of the transmission fluid flowing into the housing through the first intake port, thereby to reciprocally move with respect to the fixed rod.

3. The valve apparatus of claim 2, wherein the deformation member comprises a wax material that contracts and expands according to the temperature of the transmission fluid.

4. The valve apparatus of claim 2, wherein the elastic member is a coil spring selectively compressible according to an operation of the operation unit and abutted at one end by the inner cap and at another end by the deformation member to provide the elastic force to the operation unit.

5. The valve apparatus of claim 1, wherein a fixing ring is mounted at the open end of the housing to prevent the inner cap from separating from the housing.

6. The valve apparatus of claim 1, wherein first and second sealing rings are respectively mounted to the first and second fixing portions, such that the transmission fluid flowing into the housing is prevented from leaking between the housing and the inner cap.

7. The valve apparatus of claim 1, wherein the opening connects the first intake port and the bypass port through the open holes while the operation unit maintains an initial state partially inserted into the supporting portion.

8. The valve apparatus of claim 1, wherein a valve hole, delineated by a valve seat having a slanted surface at an interior circumference, is formed at the housing, at a first position displaced from the first intake port toward the closed end of the housing, correspondingly to the valve unit.

9. The valve apparatus of claim 8, wherein the valve unit comprises:
   a valve member coupled to a coupling step formed in the operation unit, and extending outward in a radial direction of the operation unit; and
   a tight-contact member mounted on an exterior circumference the valve member, wherein an exterior circumference of the tight-contact member is selectively tight-contacted with the slanted surface of the valve seat in accordance with an operation of the operation unit.

10. The valve apparatus of claim 9, wherein the valve member is coupled to the coupling step in a detachable press-fit state.

11. The valve apparatus of claim 9, wherein the tight-contact member is formed of a rubber material and configured to limit a movement range of the operation unit while tightly contacting the slanted surface of the valve seat by the elastic force provided from the elastic member, and to enable communication between the first intake port and the exhaust port by opening the valve hole when the operation unit operates.

12. The valve apparatus of claim 9, wherein:
   the tight-contact member is formed in a ring shape having a diameter lager than an interior diameter of the slanted surface of the valve seat;
   at least two tight-contact steps are formed in the tight-contact member so as to contact the slanted surface of the valve seat; and
   a groove is formed between the tight-contact steps.

13. The valve apparatus of claim 12, wherein the at least two tight-contact steps comprise:
   a first tight-contact step tightly contacting the slanted surface of the valve seat at a second position in a vicinity of the first intake port; and
   a second tight-contact step tightly contacting the slanted surface of the valve seat at a third position in a vicinity of the exhaust port,
   wherein the tight-contact member dually contacts the slanted surface of the valve seat through the first and second tight-contact steps, to prevent the transmission fluid from leaking between the tight-contact member and the valve seat.

14. The valve apparatus of claim 9, wherein, while the operation unit is not operating, the valve unit is configured to close the valve hole by maintaining a tight contact of the tight-contact member on the slanted surface of the valve seat such that the first intake port and the exhaust port are not interconnected.

15. The valve apparatus of claim 1, wherein the inner cap is an integrally-formed injection molding inner cap.

16. The valve apparatus of claim 1, wherein the bypass port is disposed on the first side of the housing on a same axis with the second intake port, corresponding to the open holes.

17. The valve apparatus of claim 1, wherein:
   the first intake port and the second intake port are disposed at opposite positions on different sides of the housing; and
   the exhaust port is disposed on the second side of the housing, at a staggered position with respect to the first intake port.

18. The valve apparatus of claim 1, wherein:
   when the temperature of the transmission fluid is above a predetermined value, the operation unit is configured to move toward the inner cap to compress the elastic member and simultaneously to close a connection of the first intake port and the bypass port, and the valve unit is configured to open a valve hole to open the exhaust port; and
   when the temperature of the transmission fluid is below the predetermined value, the operation unit is configured to return to or maintain an initial position by the elastic force of the elastic member to maintain connection between the first intake port and the bypass port, and the valve unit is configured to close the valve hole to close the exhaust port.

* * * * *

UNITED STATES PATENT AND TRADEMARK OFFICE
CERTIFICATE OF CORRECTION

| | |
|---|---|
| PATENT NO. | : 11,300,221 B2 |
| APPLICATION NO. | : 16/870734 |
| DATED | : April 12, 2022 |
| INVENTOR(S) | : Jae Yeon Kim |

Page 1 of 1

It is certified that error appears in the above-identified patent and that said Letters Patent is hereby corrected as shown below:

On the Title Page

Item (73), delete "INZICONIROLS" and insert --INZICONTROLS--.

Signed and Sealed this
Tenth Day of May, 2022

Katherine Kelly Vidal
*Director of the United States Patent and Trademark Office*